US009219431B2

(12) United States Patent
Hirono (10) Patent No.: US 9,219,431 B2
(45) Date of Patent: Dec. 22, 2015

(54) MOTOR CONTROL DEVICE (75) Inventor: Daisuke Hirono, Isesaki (JP)

(73) Assignee: SANDEN CORPORATION, Gunma (JP)

( * ) Notice: Subject to any disclaimer, the term of this patent is extended or adjusted under 35 U.S.C. 154(b) by 227 days.

(21) Appl. No.: 14/113,352

(22) PCT Filed: Mar. 23, 2012

(86) PCT No.: PCT/JP2012/057542
§ 371 (c)(1),
(2), (4) Date: Oct. 22, 2013

(87) PCT Pub. No.: WO2012/144290
PCT Pub. Date: Oct. 26, 2012

(65) Prior Publication Data
US 2014/0049203 A1    Feb. 20, 2014

(30) Foreign Application Priority Data
Apr. 22, 2011  (JP) ................................. 2011-095691

(51) Int. Cl.
H02P 6/18        (2006.01)
H02P 6/00        (2006.01)
H02P 21/00       (2006.01)

(52) U.S. Cl.
CPC ........ *H02P 6/00* (2013.01); *H02P 6/182* (2013.01); *H02P 21/0042* (2013.01)

(58) Field of Classification Search
CPC ............. H02P 6/182; H02P 6/20; H02P 1/46; H02P 25/023; H02P 25/083; H02P 6/18
USPC ................. 318/400.32, 400.34, 400.35
See application file for complete search history.

(56) References Cited

U.S. PATENT DOCUMENTS

| 5,818,192 | A  | * | 10/1998 | Nozari ........................... 318/609 |
| 6,396,229 | B1 |   | 5/2002  | Sakamoto et al. |
| 7,342,378 | B2 | * | 3/2008  | Sakamoto et al. ............ 318/717 |
| 8,664,906 | B2 | * | 3/2014  | Hirono ..................... 318/400.34 |
| 9,035,581 | B2 | * | 5/2015  | Hirono ..................... 318/400.02 |
| 2002/0153857 | A1 |   | 10/2002 | Iwaji et al. |
| 2006/0012329 | A1 |   | 1/2006  | Aoki et al. |

FOREIGN PATENT DOCUMENTS

| JP | 2006-54930 | 2/2006 |
| JP | 2011-10438 | 1/2011 |

* cited by examiner

*Primary Examiner* — Bentsu Ro
(74) *Attorney, Agent, or Firm* — Cozen O'Connor (57) ABSTRACT The present invention relates to a motor control device provided with the function of detecting the rotor position of a synchronous motor in a sensor-less fashion. The motor control device previously stores a current phase β defined by the two parameters that are an induced voltage peak value Ep and the subtracted value (θe−θi) obtained by subtracting an induced voltage electrical angle θe from a current electrical angle θi, and based on the actual detected Ep, θi, and θe, selects β by referring to the β previously stored, and calculates the rotor position θm by subtracting the selected β from the actual detected θi. Then, in case of selecting β, the actual detected Ep and θe are corrected according to changes in the current flowing through the coil. As a result, a detection accuracy for the rotor position during a transition period is enhanced.

5 Claims, 7 Drawing Sheets

| Ep [V] | θe−θi [°] | β [°] |
|---|---|---|
| ⋮ | ⋮ | ⋮ |
| 44 | 25 | −13 |
| 44 | 26 | −15 |
| 44 | 27 | −17 |
| ⋮ | ⋮ | ⋮ |
| 45 | 25 | 4 |
| 45 | 26 | −7 |
| 45 | 27 | −10 |
| ⋮ | ⋮ | ⋮ |
| 46 | 25 | 20 |
| 46 | 26 | 12 |
| 46 | 27 | 3 |
| ⋮ | ⋮ | ⋮ |

FIG. 4

| PARAMETERS | | | DEFINED VALUES |
|---|---|---|---|
| Ep | θe-θi | — | CURRENT PHASE β |
| Ip | θe-θi | — | CURRENT PHASE β |
| Ep | Ip | — | CURRENT PHASE β |
| Ep | Ip | θe-θi | CURRENT PHASE β |
| Ep | θe-θi | — | INDUCED VOLTAGE PHASE γ |
| Ip | θe-θi | — | INDUCED VOLTAGE PHASE γ |
| Ep | Ip | — | INDUCED VOLTAGE PHASE γ |
| Ep | Ip | θe-θi | INDUCED VOLTAGE PHASE γ |

MOTOR CONTROL DEVICE

RELATED APPLICATIONS

This application is a U.S. National Phase Application under 35 USC 371 of International Application PCT/JP2012/057542 filed Mar. 23, 2012.

This application claims the priority of Japanese application No. 2011-095691 filed Apr. 22, 2011, the entire content of which are hereby incorporated by reference.

TECHNICAL FIELD

The present invention relates to a motor control device having a function of detecting a rotating rotor position of a synchronous motor in a sensor-less manner, and more specifically, relates to a motor control device that enhances a detection accuracy for a rotor position at the time of transition.

BACKGROUND ART

A conventional motor control device directly obtains a rotor position by selecting a current phase or the like from a data table previously storing a current phases and others in a rotating coordinate system based on detected values concerning a coil current and an induced voltage. Here, in the data table, a voltage equation that is established in a steady state in which a load relative to the synchronous motor is fixed is assumed, and a current phase or the like is defined with parameters including an induced voltage peak value or an induced voltage electrical angle. When this data table is used, a rotor position of a synchronous motor can be detected with a fixed accuracy and a low-processing load (see, e.g., Patent Document 1).

CITATION LIST

Patent Document

Patent Document 1: Japanese Laid-open Patent Application Publication No. 2011-10438

SUMMARY OF THE INVENTION

Problems to be Solved by the Invention

However, when a load of the synchronous motor rapidly fluctuates, a coil current changes in a short time, and an induced voltage produced due to an inductance of a coil greatly increases or decreases, but a data table used by a conventional motor control device presumes a voltage equation that is established in a steady state but does not assume an increase or a decrease in induced voltage involved in a rapid fluctuation in load relative to the synchronous motor. Therefore, a current phase directly selected from the data table based on a detected value concerning the induced voltage is different from an actual current phase, and hence there is a possibility that a rotor position is not accurately detected.

Therefore, in view of the above-described conventional problem, it is an object of the present invention to provide a motor control device that has a detection accuracy for a rotor position at the time of transition enhanced by correcting a detected value concerning an induced voltage according to a change in coil current caused due to a rapid fluctuation in load.

Means for Solving the Problems

In order to achieve the abovementioned object, according to the present invention, there is provided a motor control device having a function of detecting a rotating rotor position of a synchronous motor in a sensor-less manner, including: current detecting means for detecting a current flowing through a coil of the synchronous motor; voltage detecting means for detecting a voltage applied to the coil of the synchronous motor; Ip and $\theta i$ detecting means for detecting a current peak value Ip and a current electrical angle $\theta i$ based on the current detected by the current detecting means; Ep and $\theta e$ detecting means for detecting an induced voltage peak value Ep and an induced voltage electrical angle $\theta e$ based on the current detected by the current detecting means and the voltage detected by the voltage detecting means; phase storing means for previously storing a current phase $\beta$ or an induced voltage phase $\gamma$ defined by at least two parameters selected from a value of Ip, a value of Ep, and a subtracted value $(\theta e - \theta i)$ obtained by subtracting $\theta i$ from $\theta e$; phase selecting means for selecting $\beta$ or $\gamma$ based on Ip and $\theta i$ detected by the Ip and $\theta i$ detecting means and Ep and $\theta e$ detected by the Ep and $\theta e$ detecting means by making reference to $\beta$ or $\gamma$ stored in the phase storing means; and rotor position calculating means for calculating a rotor position $\theta m$ from a rotor position computational expression using $\beta$ selected by the phase selecting means as a first variable and using $\theta i$ detected by the Ip and $\theta i$ detecting means as a second variable, or a rotor computational expression using $\gamma$ selected by the phase selecting means as a first variable and using $\theta e$ detected by the Ep and $\theta e$ detecting means as a second variable. The motor control device further includes correcting means for correcting at least one of Ep and $\theta e$, which are detected by the Ep and $\theta e$ detecting means and included in the at least two parameters that define $\beta$ or $\gamma$, according to a change in current flowing through the coil at the time of selecting $\beta$ or $\gamma$ by the phase selecting means.

With such a configuration, the correcting means corrects, according to a change in current flowing through the coil, at least one of Ep and $\theta e$ which are detected by the Ep and $\theta e$ detecting means to select the current phase $\beta$ or the induced voltage phase $\gamma$ in the phase selecting means and included in the at least two parameters that define the current phase $\beta$ or the induced voltage phase $\gamma$.

Furthermore, the correcting means may correct Ep or $\theta e$ detected by the Ep and $\theta e$ detecting means based on a coil current change rate at which a d axis component and a q axis component in a rotating coordinate system of the current flowing through the coil change within a predetermined time. As a result, Ep or $\theta e$ detected by the Ep and $\theta e$ detecting means is corrected based on the coil current change rate at which the d axis component and the q axis component in the rotating coordinate system of the current flowing through the coil change within the predetermined time.

Furthermore, the correcting means may correct $\theta e$ detected by the Ep and $\theta e$ detecting means based on a variation $\Delta \theta$ of $\theta e$ obtained by using the coil current change rate. As a result, $\theta e$ detected by the Ep and $\theta e$ detecting means is corrected based on the variation $\Delta \theta$ of $\theta e$ obtained using the coil current change rate.

Moreover, the coil current change rate is obtained by subtracting the d axis component and the q axis component of the current detected by the current detecting means at present from the d axis component and the q axis component of the current detected immediately before the present detection, respectively, and dividing each subtraction result by a time interval between the present detection and the previous detection. As a result, the d axis component and the q axis component of the current detected by the current detecting means at present are subtracted from the d axis component and the q axis component detected immediately before this detection, respectively, and this subtraction result is divided by the time interval between the current detection and the previous detection, respectively, thereby obtaining the coil current change rate.

Advantageous Effect of the Invention

According the invention as claimed in claim 1, the correcting means can correct, according to a change in current flowing through the coil, at least one of the induced voltage peak value Ep and the induced voltage electrical angle θe that are detected by the Ep and θe detecting means and included in at least two parameters defining the current phase β or the induced voltage phase γ, at the time of selecting the current phase β or the induced voltage phase γ by the phase selecting means. Therefore, since the current phase β or the induced voltage phase γ can be selected based on the parameters including at least one of Ep and θe corrected according to the rapid fluctuation in load, the detection accuracy of the rotor position at the time of transition can be enhanced.

Moreover, according to the invention as claimed in claim 2, Ep or θe detected by the Ep and θe detecting means can be corrected based on the coil current change rate at which the d axis component and the q axis component in the rotating coordinate system of the current flowing through the coil change within the predetermined time. Therefore, the corrected value of Ep or θe corrected based on the coil current change rate can be used for the at least two parameters that define the current phase β or the induced voltage phase γ.

Additionally, according to the invention as claimed in claim 3, θe detected by the Ep and θe detecting means can be corrected based on the variation Δθ of θe obtained using the coil current change rate. Therefore, the corrected value of θe corrected based on Δθ can be used for the at least two parameters that define the current phase β or the induced voltage phase γ.

Furthermore, according to the invention as claimed in claim 4, the coil current change rate can be obtained by subtracting the d axis component and the q axis component of the current detected by the current detecting means at present from the d axis component and the q axis component detected immediately before this detection, respectively, and dividing this subtraction result by the time interval between the current detection and the previous detection. Therefore, when the coil current change rate during each detection time interval is detected according to each detection of the current by the current detecting means, Ep or θe detected by the Ep and θe detecting means can be approximated to an actual change in induced voltage to be corrected.

MODE FOR CARRYING OUT THE INVENTION

Hereunder, an embodiment according to the present invention will be described in detail with reference to the accompanying drawings.

Figure 1:
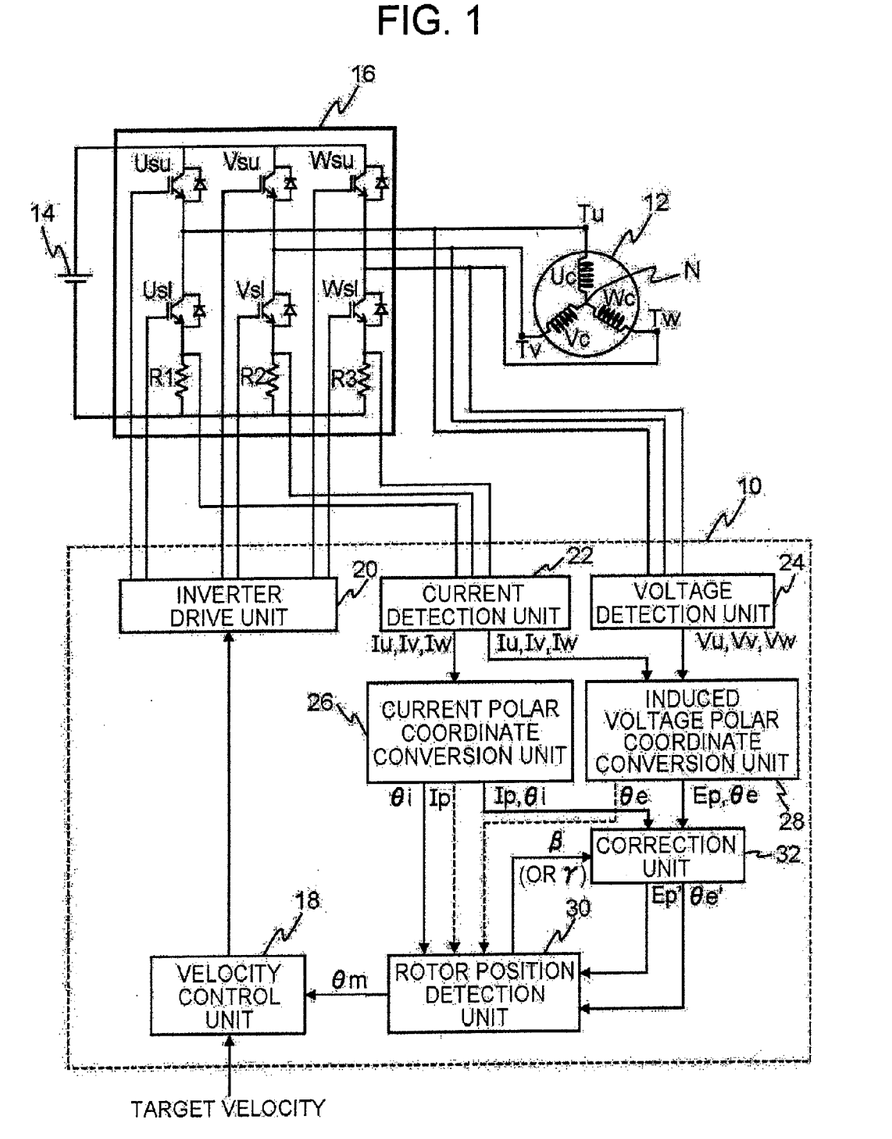
FIG. 1 is a structural view showing an embodiment of a motor control device according to the present invention.

FIG. 1 is a view showing an embodiment of a motor control device according to the present invention. This motor control device 10 has a function of detecting a rotating rotor position of a synchronous motor 12 in a sensor-less manner, controls an inverter 16 that supplies electric power from a direct-current power supply 14 to the synchronous motor 12, and has a non-illustrated built-in computer. A shaft output of the synchronous motor 12 is used for driving a compressor (not shown) that compresses a refrigerant in a refrigerating cycle in an air conditioner for vehicles, for example, and it may be used for driving a compressor in a refrigerating cycle of a refrigerator or freezer and others which are of an in-car type and a stationary type.

The synchronous motor 12 is formed of a three-phase brushless motor, and it has a non-illustrated stator including three-phase coils, that is, a U phase coil Uc, a V phase coil Vc, and a W phase coil Wc, and a non-illustrated rotor including a permanent magnet. One side ends of the U phase coil Uc, the V phase coil Vc, and the W phase coil Wc are electrically connected at a neutral point N so that the U phase coil Uc, the V phase coil Vc, and the W phase coil Wc are star-connected, and they may be delta-connected.

An inverter 16 has six switching elements, and a switching element on a high side and a switching element on a low side are connected to each of terminals Tu, Tv, and Tw on the other side ends, which are not connected to the neutral point N, of the three phase coils of the synchronous motor 12. An IGBT is used for the switching element, and a transistor such as an MOSFET or a bipolar transistor or a GTO may be used.

Respective emitters of upper switching elements Usu, Vsu, and Wsu on the high side in the switching elements connected to the terminals Tu, Tv, and Tw, are connected to the terminals Tu, Tv, and Tw, and collectors thereof are connected to a positive electrode of a direct-current power supply 14. Furthermore, respective collectors of lower switching elements Usl, Vsl, and Wsl on the low side in the switching elements connected to the terminals Tu, Tv, and Tw, are connected to the terminals Tu, Tv, and Tw, and emitters thereof are connected to a negative electrode of the direct-current power supply 14. Gates of the respective switching elements Usu, Usl, Vsu, Vsl, Wsu, and Wsl are connected to a later-described inverter drive unit.

Furthermore, the inverter 16 has shunt resistances R1, R2, and R3 configured to detect currents flowing through the respective phases of the synchronous motor 12. The shunt resistance R1 is interposed between the lower switching element Usl and the direct-current power supply 14, the shunt resistance R2 is interposed between the lower switching element Vsl and the direct-current power supply 14, and the shunt resistance R3 is interposed between the lower switching element Wsl and the direct-current power supply 14.

As shown in FIG. 1, the motor control device 10 according to the present invention is constituted of a velocity control unit 18, an inverter drive unit 20, a current detection unit 22, a voltage detection unit 24, a current polar coordinate conversion unit 26, an induced voltage polar coordinate conversion unit 28, a rotor position detection unit 30, and a correction unit 32.

The velocity control unit 18 supplies a control signal for rotating the synchronous motor 12 at a predetermined number of revolutions or stopping the same to the inverter drive unit 20 based on a target velocity from a non-illustrated operation unit and a rotor position θm from the rotor position detection unit 30.

The inverter drive unit 20 supplies a drive signal for turning on and off each switching element, to the gates of the upper switching elements Usu, Vsu, and Wsu and the gates of the lower switching elements Usl, Vsl, and Wsl in the inverter 16 based on a control signal from the velocity control unit 18. The upper switching elements Usu, Vsu, and Wsu and the lower switching elements Usl, Vsl, and Wsl are turned on and off in a predetermined pattern in response to the drive signal from the inverter drive unit 20, and sine wave energization (180-degree energization) based on this predetermined pattern is carried out with respect to the U phase coil Uc, the V phase coil Vc, and the W phase coil Wc of the synchronous motor 2.

The current detection unit 22 serves as current detecting means for detecting currents flowing through the U phase coil Uc, the V phase coil Vc, and the W phase coil Wc in the synchronous motor 12 (a U phase current Iu, a V phase current Iv, and a W phase current Iw). This current detection unit 22 is connected to the shunt resistances R1, R2, and R3 on the side close to the lower switching elements Usl, Vsl, and Wsl in the inverter 16, and detects the currents Iu, Iv, and Iw by using voltages detected at connection points of these members. Furthermore, these currents Iu, Iv, and Iw are supplied to the current polar coordinate conversion unit 26 and the induced voltage polar coordinate conversion unit 28.

The voltage detection unit 24 serves as voltage detecting means for detecting voltages (a U phase voltage Vu, a V phase voltage Vv, and a W phase voltage Vw) applied to the U phase coil Uc, the V phase coil Vc, and the W phase coil Wc in the synchronous motor 12. This voltage detection unit 24 is connected to respective branch lines from a connection line connecting the switching elements Usu and Usl with the terminal Tu, a connection line connecting the switching elements Vsu and Vsl with the terminal Tv, and a connection line connecting the switching elements Wsu and Wsl with the terminal Tw. Furthermore, the voltages Vu, Vv, and Vw are supplied to the induced voltage polar coordinate conversion unit 28.

The current polar coordinate conversion unit 26 serves as Ip and θI detecting means for detecting a current peak value Ip and a current electrical angle θi based on the currents Iu, Iv, and Iw of the respective phases detected by the current detection unit 22.

The induced voltage polar coordinate conversion unit 28 serves as Ep and θe detecting means for detecting an induced voltage peak value Ep and an induced voltage electrical angle θe based on the currents Iu, Iv, and Iw detected by the current detection unit 22 and the voltages Vu, Vv, and Vw detected by the voltage detection unit 24.

Figure 2:
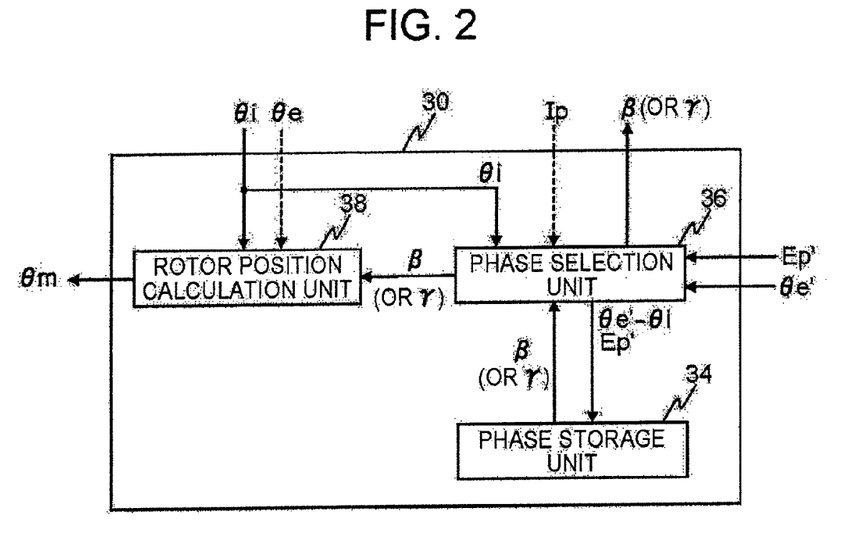
FIG. 2 is a block diagram for explaining an internal configuration of a rotor position detection unit in FIG. 1.

The rotor position detection unit 30 detects a rotor position θm based on detected values detected by the current polar coordinate conversion unit 26 and the induced voltage polar coordinate conversion unit 28 and supplies the detected position to the velocity control unit 18. As shown in FIG. 2, the rotor position detection unit 30 is constituted of a phase storage unit 34, a phase selection unit 36, and a rotor position calculation unit 38.

Figure 3:
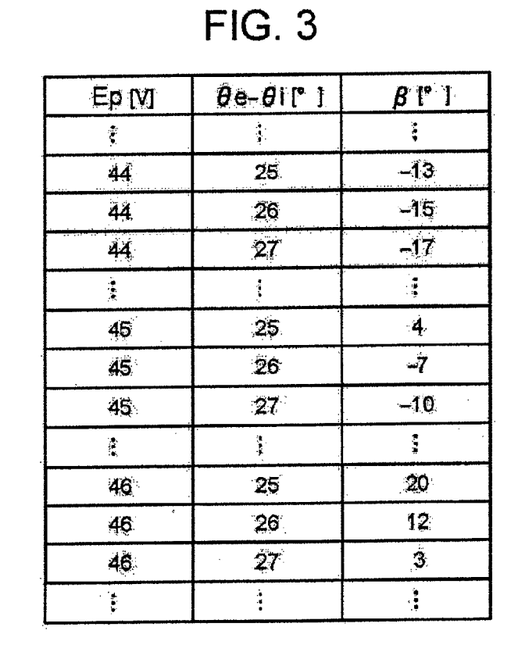
FIG. 3 is an explanatory view for explaining an example of a data table that defines a current phase.

The phase storage unit 34 serves as phase storing means for previously storing a current phase β defined by two parameters, that is, the induced voltage peak value Ep and a subtracted value (θe−θi) obtained by subtracting the current electrical angle θi from the induced voltage electrical angle θe. As shown in FIG. 3, the current phase β based on a q axis of a dq coordinate system which is a rotating coordinate system is stored in, for example, an ROM (Read Only Memory) of the phase storage unit 34 as a data table together with the two parameters that define β. This data table is constituted of each current phase β obtained when, for example, the induced voltage peak value Ep is changed in increments of 1 V and the subtracted value (θe−θi) is changed in increments of one degree in a steady state that load of the synchronous motor 12 is fixed.

Figure 4:
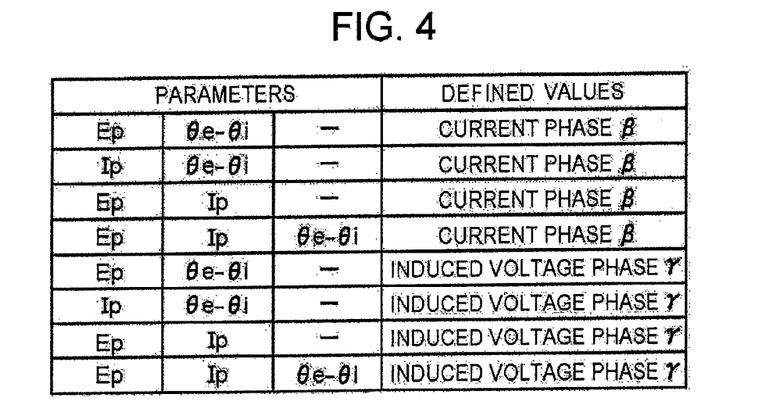
FIG. 4 is an explanatory view showing parameters that define the current phase or an induced voltage phase.

It is to be noted that, as the parameters that define the current phase β, in place of the two parameter, that is, the induced voltage peak value Ep and the subtracted value (θe−θi), as illustrated in FIG. 4, it is possible to use two parameters, that is, the current peak value Ip and the subtracted value (θe−θi), two parameters, that is, the current peak value Ip and the induced voltage peak value Ep, or three parameters, that is, the current peak value Ip, the induced voltage peak value Ep, and the subtracted value (θe−θi) in order to define the current phase β. Furthermore, these parameters may define the induced voltage phase γ in place of the current phase β. In short, the phase storing unit 34 stores the current phase β or the induced voltage phase γ defined by at least the two parameters in the current peak value Ip, the induced voltage peak value Ep, and the subtracted value (θe−θi), as the data table.

The phase selection unit 36 serves as phase selecting means for selecting the current phase β based on the detected values detected by the current polar coordinate conversion unit 26 and the induced voltage polar coordinate conversion unit 28 by making reference to the current phase β stored as the data table in the phase storage unit 34. Moreover, the selected current phase β is supplied to the rotor position calculation unit 38. It is to be noted that, when data stored as the data table in the phase storage unit 34 is the induced voltage phase γ, the induced voltage phase γ may be selected based on the detected value, and the obtained value may be supplied to the rotor position calculation unit 38.

The rotor position calculation unit 38 serves as rotor position calculation means for calculating a rotor position θm of the synchronous motor 12 from a rotor position computation expression which uses the current phase β selected by the phase selection unit 36 as a first variable and uses the current electrical angle θi detected by the current polar coordinate conversion unit 26 as a second variable. Additionally, the calculated rotor position θm is supplied to the velocity control unit 18. It is to be noted that, when the induced voltage phase γ is selected by the phase selection unit 36, the rotor position θm may be calculated based on a rotor position computation expression in which the induced voltage phase γ is defined as a first variable and also the induced voltage electrical angle θe detected by the induced voltage polar coordinate conversion unit 28 is defined as a second variable, and the calculated position may be supplied to the velocity control unit 18.

Here, as shown in FIG. 1, the correction unit 32 as correcting means is provided between the induced voltage polar coordinate conversion unit 28 and the rotor position detection unit 30. This correction unit 32 corrects the induced voltage peak value Ep and the induced voltage electrical angle θe detected by the induced voltage polar coordinate conversion unit 28 according to a change in current flowing through the coil at the time of selecting the current phase β in the phase selection unit 36 shown in FIG. 2. It is to be noted that the correction unit 32 may correct any one of the induced voltage peak value Ep and the induced voltage electrical angle θe to reduce a burden on control processing in the motor control device 10. In short, the correction unit 32 corrects at least one of the induced voltage peak value Ep and the induced voltage electrical angle θe that are detected by the induced voltage polar coordinate conversion unit 28 and included in at least two parameters that define the current phase β according to a change in current flowing through the coil at the time of selecting the current phase β in the phase selection unit 36. The correction unit 32 corrects at least one of the induced voltage peak value Ep and the induced voltage electrical angle θe at the time of selecting the induced voltage phase γ in the phase selection unit 36, in a similar manner as at the time of selecting the current phase β.

An intended function of the correction unit 32 will be described in detail.

Figure 5:
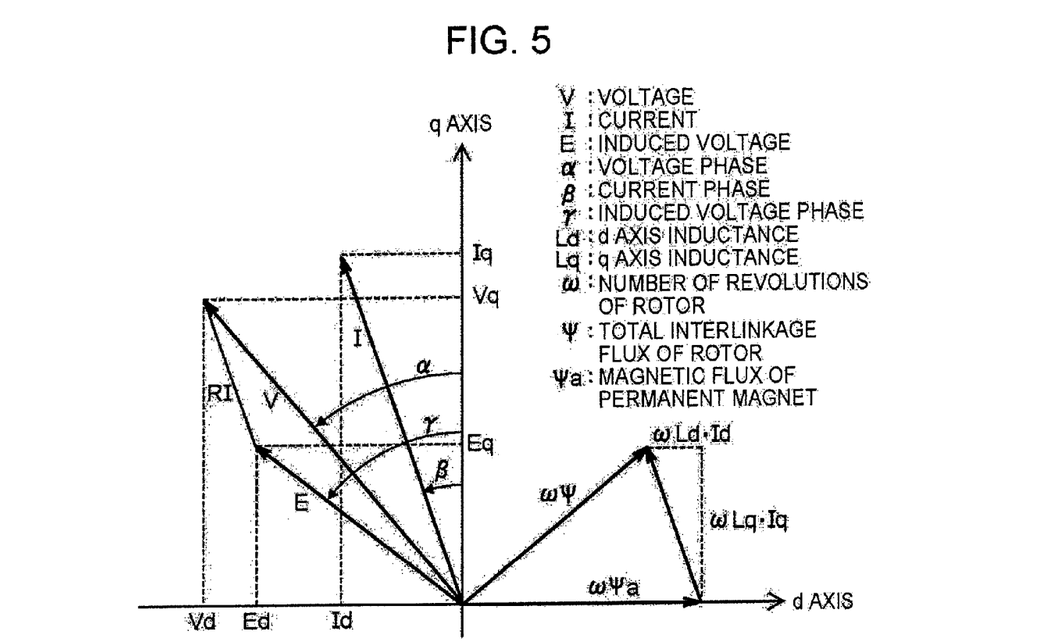
FIG. 5 is a motor vector diagram.

FIG. 5 is a motor vector diagram when the rotor of the synchronous motor 12 rotates in a steady state, and relationship between a voltage V, a current I, and an induced voltage E are shown as vectors in a dq coordinate system. In FIG. 5, a sign Vd represents a d axis component of the voltage V; a sign Vq represents a q axis component of the voltage V; a sign Id represents a d axis component of the current I; a sign Iq represents a q axis component of the current I; a sign Ed represents a d axis component of the induced voltage E; a sign Eq represents a q axis component of the induced voltage E; a sign α represents a voltage phase based on the q axis; a sign β represents a current phase based on the q axis; and a sign γ represents an induced voltage phase based on the q axis. Furthermore, in FIG. 5, a sign Ld represents a d axis inductance; a sign Lq represents a q axis inductance; a sign R represents a resistance value of the coil of the stator; a sign ψ represents a total interlinkage flux of the rotor; a sign ψa represents the number of magnetic fluxes of a permanent magnet of the rotor.

Based on this motor vector diagram, assuming that the number of revolutions of the rotor is ω, the following expression can be established:

$$\begin{pmatrix} Vd \\ Vq \end{pmatrix} = \begin{pmatrix} R & -\omega Lq \\ \omega Ld & R \end{pmatrix} \begin{pmatrix} Id \\ Iq \end{pmatrix} + \begin{pmatrix} 0 \\ \omega\psi a \end{pmatrix} \quad \text{[Expression 1]}$$

When the d axis component Ed and the q axis component Eq of the induced voltage E represented as Ed=Vd−Id×R and Eq=Vq−Iq×R are used, the following expression can be established:

$$\begin{pmatrix} Ed(=Vd-Ra\cdot Id) \\ Eq(=Vq-Ra\cdot Iq) \end{pmatrix} = \begin{pmatrix} 0 & -\omega Lq \\ \omega Ld & 0 \end{pmatrix} \begin{pmatrix} Id \\ Iq \end{pmatrix} + \begin{pmatrix} 0 \\ \omega\psi a \end{pmatrix} \quad \text{[Expression 2]}$$

On presumption that a voltage equation in this steady state is established, the data table stored in the phase storage unit 34 defines the current phase β with two parameters, that is, the induced voltage peak value Ep and a subtracted value (θe−θi) obtained by subtracting the current electrical angle θi from the induced voltage electrical angle θe. In the motor vector diagram, the induced voltage peak value Ep is represented by the following expression:

$$Ep = \sqrt{Ed^2 + Eq^2} \quad \text{[Expression 3]}$$

The subtracted value (θe−θi) corresponds to a subtracted value (γ−β=tan(Eq/Ed)−tan (Iq/Id)) obtained by subtracting the current phase β from the induced voltage phase γ.

However, in case of a non-steady state that a load of the synchronous motor 12 rapidly fluctuates, the coil current changes in a short time, and the induced voltage caused due to the inductance of the coil greatly varies. Therefore, assuming that p is an operator of time differentiation, terms pLd·Id and pLq·Iq are added and values of Ed and Eq vary as compared with the steady state as shown in the following expression:

$$\begin{pmatrix} Ed(=Vd-Ra\cdot Id) \\ Eq(=Vq-Ra\cdot Iq) \end{pmatrix} = \quad \text{[Expression 4]}$$
$$\begin{pmatrix} 0 & -\omega Lq \\ \omega Ld & 0 \end{pmatrix} \begin{pmatrix} Id \\ Iq \end{pmatrix} + \begin{pmatrix} 0 \\ \omega\psi a \end{pmatrix} + \begin{pmatrix} pLd\cdot Id \\ pLq\cdot Iq \end{pmatrix}$$

That is, as compared with the steady state, the induced voltage peak value Ep and the subtracted value (θe−θi) vary. Therefore, in the non-steady state, based on the induced voltage peak value Ep and the induced voltage electrical angle θe detected by the induced voltage polar coordinate conversion unit 28, even if reference is made to the data table presuming the expression that is established in the steady state and the current phase β is selected, this current phase β is greatly different from an actual current phase, and hence the rotor position θm cannot be accurately detected.

The correction unit 32 removes deviations of a value of pLd·Id and a value of pLq·Iq for the induced voltage peak value Ep and the induced voltage electrical angle θe detected by the induced voltage polar coordinate conversion unit 28 in the steady state from those in the non-steady state, and corrects the induced voltage peak value Ep and the induced voltage electrical angle θe to a correction value Ep' and a correction value θe', respectively.

Figure 6:
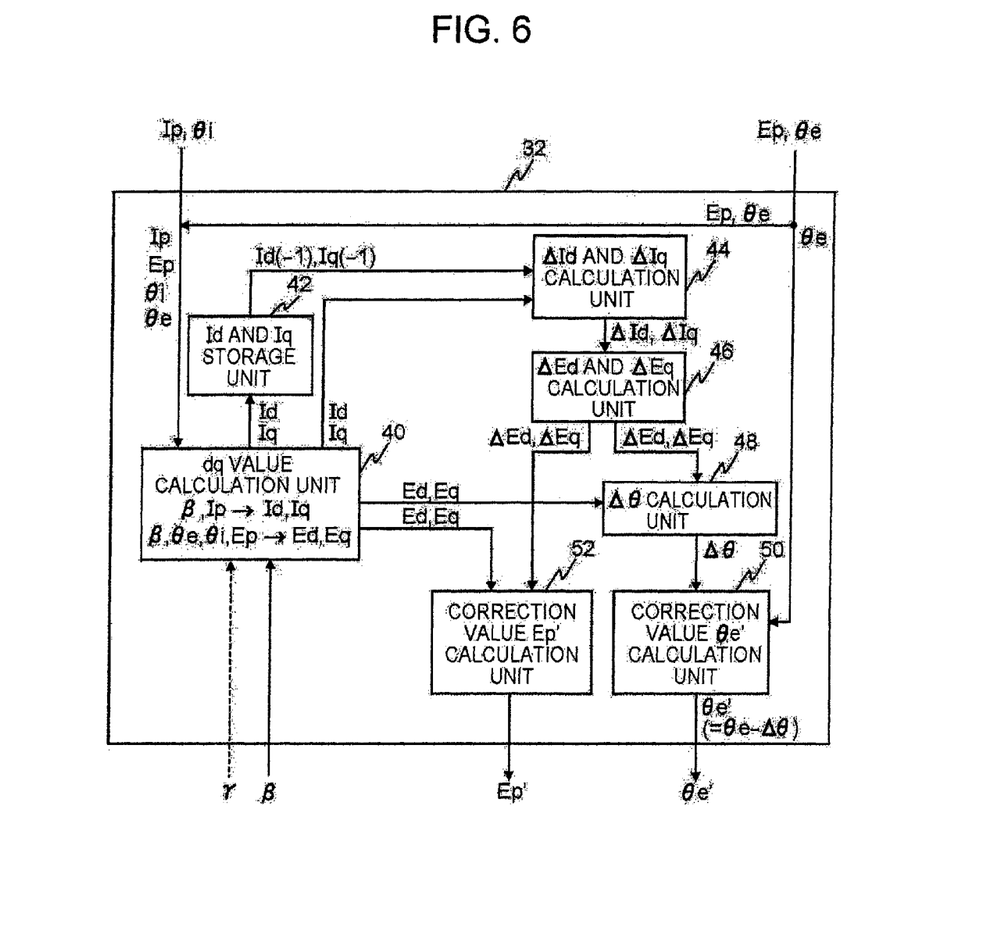
FIG. 6 is a block diagram for explaining an internal configuration of a correction unit in FIG. 1.

As shown in FIG. 6, the correction unit 32 is constituted of a dq value calculation unit 40, an Id and Iq storage unit 42, a ΔId and ΔIq calculation unit 44, a ΔEd and ΔEq calculation unit 46, a Δθ calculation unit 48, a correction value θe' calculation unit 50, and a correction value Ep' calculation unit 52.

The dq value calculation unit 40 calculates the d axis component Id and the q axis component Iq of the current I and the d axis component Ed and the q axis component Eq of the induced voltage E in the dq coordinate system which is a rotating coordinate system based on the current peak value Ip and the current electrical angle θi detected by the current polar coordinate conversion unit 26 in FIG. 1, the induced voltage peak value Ep and the induced voltage electrical angle θe detected by the induced voltage polar coordinate conversion unit 28 in FIG. 1, and the current phase β already selected by the phase selection unit 36 in FIG. 2 in a process of calculating the previous rotor position θm. Furthermore, the d axis component Id and the q axis component Iq of the current I are supplied to the Id and the Iq storage unit 42 and the ΔId and ΔIq calculation unit 44, and the d axis component Ed and the q axis component Eq of the induced voltage E are supplied to the Δθ calculation unit 48 and the correction value Ep' calculation unit 52. It is to be noted that, when the phase selection unit 36 has selected the induced voltage phase γ in the process of calculating the previous rotor position θm, by using the induced voltage phase γ in place of the current phase β, Id, Iq, Ed, and Eq may be calculated.

The Id and Iq storage unit 42 stores the d axis component Id and the q axis component Iq of the current I calculated by the dq value calculation unit 40 according to each calculation.

The ΔId and ΔIq calculation unit 44 calculates a d axis component ΔId and a q axis component ΔIq in a variation of the current I based on Id and Iq calculated by the dq value calculation unit 40 and Id(−1) and Iq(−1) stored in a process of calculating the previous rotor position θm in Id and Iq stored in the Id and Iq storage unit 42, and supplies the calculated components to the ΔEd and ΔEq calculation unit 46.

The ΔEd and ΔEq calculation unit 46 calculates a d axis component ΔEd corresponding to pLd·Id mentioned above in the variation of the induced voltage E and a q axis component ΔEq corresponding to pLq·Iq mentioned above in the variation of the induced voltage E based on the variations ΔId and ΔIq of the current I calculated by the ΔId and ΔIq calculation unit 44, and supplies the calculated components to the Δθ calculation unit 48 and the correction value Ep' calculation unit 52.

The Δθ calculation unit 48 calculates a variation Δθ of the induced voltage electrical angle θe based on Ed and Eq calculated by the dq value calculation unit 40 and ΔEd and ΔEq calculated by the ΔEd and ΔEq calculation unit 46, and supplies it to the correction value θe' calculation unit 50.

The correction value θe' calculation unit 50 calculates a correction value θe' of the induced voltage electrical angle θe based on the induced voltage electrical angle θe detected by the induced voltage polar coordinate conversion unit 28 in FIG. 1 and Δθ calculated by the Δθ calculation unit 48, and supplies it to the phase selection unit 36.

The correction value Ep' calculation unit 52 calculates a correction value Ep' of the induced voltage peak value Ep based on Ed and Eq calculated by the dq value calculation unit 40 and ΔEd and ΔEq calculated by the ΔEd and ΔEq calculation unit 46, and supplies it to the phase selection unit 36.

Figure 7:
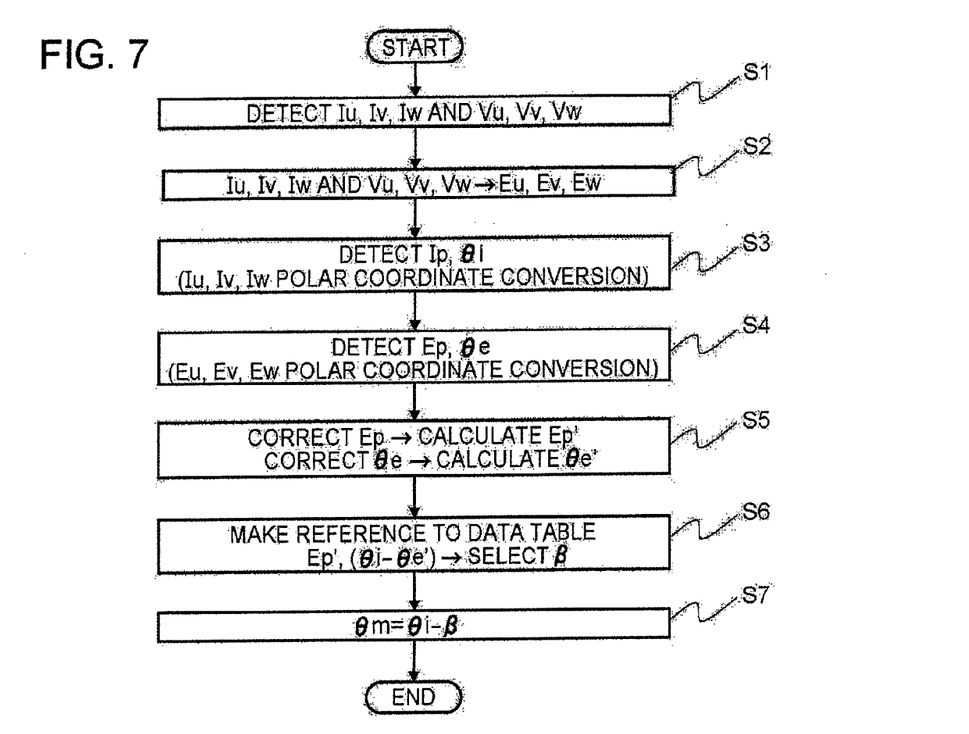
FIG. 7 is a flowchart showing an operation of a motor control device according to the present invention.

Hereunder control processing executed by the abovementioned motor control device will be described with reference to a flowchart of FIG. 7. In addition, it is assumed that the rotor position θm is calculated at least twice in the rotor position calculation unit 38.

First, the currents Iu, Iv, and Iw of the respective phases and the voltages Vu, Vv, and Vw of the respective phases in the synchronous motor 12 are detected (a step S1).

Then, the induced voltages Eu, Ev, and Ew of the respective phases are detected. Specifically, the voltages are detected by executing the following calculation. That is, relational expressions Vu−Iu×Ru=Eu, Vv−Iv×Rv=Ev, and Vw−Iw×Rw=Ew are established between the U phase voltage Vu, the V phase voltage Vv, and the W phase voltage Vw, the U phase current Iu, the V phase current Iv, and the W phase current Iw, the U phase coil resistance Ru, the V phase coil resistance Rv, and the W phase coil resistance Rw, and the U phase induced voltage Eu, the V phase induced voltage Ev, and the W phase induced voltage Ew. Since the coil resistances Ru, Rv, and Rw are already known, assigning values of the currents Iu, Iv, and Iw of the respective phases and values of the voltages Vu, Vv, and Vw of the respective phases detected at the step S1 to the relational expressions enables calculating the induced voltages Eu, Ev, and Ew of the respective phases (a step S2).

Figure 8:
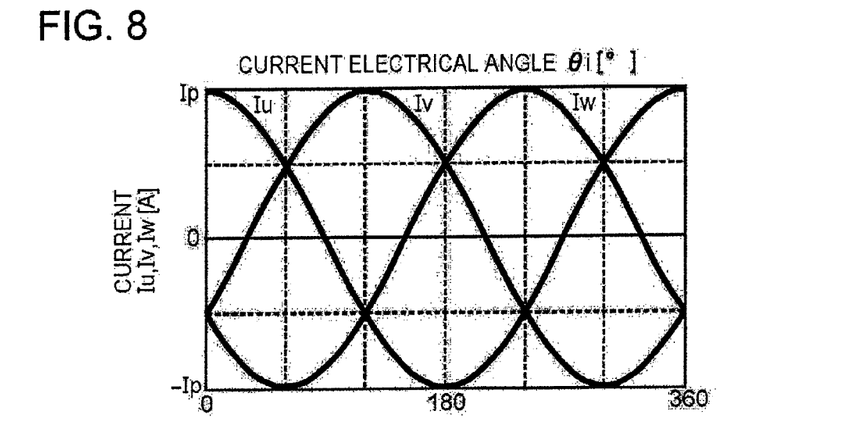
FIG. 8 is an explanatory view showing a current waveform of each phase in a synchronous motor.

Subsequently, the current peak value Ip and the current electrical angle θi are detected. Specifically, these values are detected by executing the following calculation. That is, as shown in FIG. 8, relational expressions Iu=Ip×cos θi, Iv=Ip×cos (θi−120°), and Iw=Ip×cos (θi+120°) are established between the currents Iu, Iv, and Iw of the respective phases, the current peak value Ip, and the current electrical angle θi during sine wave energization (180° energization). Values of the currents Iu, Iv, and Iw of the respective phases detected at the step S1 are assigned to these relational expressions, and simultaneous equations of Ip and θi are solved, thereby obtaining the current peak value Ip and the current electrical angle θi (a step S3).

Figure 9:
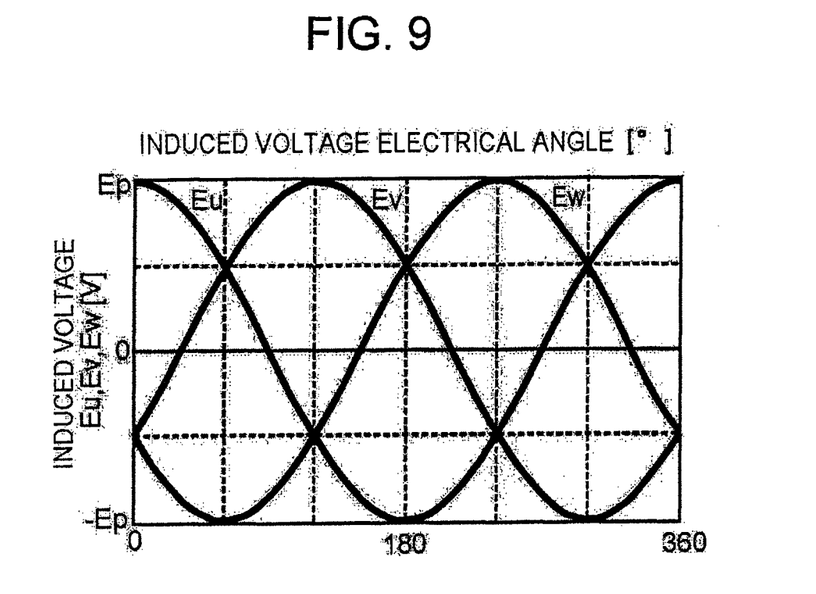
FIG. 9 is an explanatory view showing a waveform of an induced voltage of each phase in the synchronous motor.

Then, the induced voltage peak value Ep and the induced voltage electrical angle θe are detected. Specifically, these values are detected by executing the following calculation. That is, as shown in FIG. 9, relational expressions Eu=Ep×cos θe, Ev=Ep×cos (θe−120°), and Ew=Ep×cos (θe+120°) are established between the induced voltages Eu, Ev, and Ew of the respective phases, the induced voltage peak value Ep, and the induced voltage electrical angle θe during sine wave energization (180° energization). Values of the induced voltages Eu, Ev, and Ew of the respective phases detected in the step S2 are assigned to these relational expressions, and simultaneous equations of Ep and θe are solved, thereby obtaining the induced voltage peak value Ep and the induced voltage electrical angle θe (a step S4).

Moreover, based on the current peak value Ip and the current electrical angle θi detected at the step S3, the induced voltage peak value Ep and the induced voltage electrical angle θe detected at the step S4, and the current phase β already selected by the phase selection unit 36 in the process of calculating the previous rotor position θm, the correction value Ep' of the induced voltage peak value Ep and the correction value θe' of the induced voltage electrical angle θe are calculated (a step S5). Hereunder this step will be explained in detail.

Then, the current phase β is selected by making reference to the data table stored in the phase storage unit 34. Specifically, the correction value Ep' calculated in the step S5 is determined as a parameter Ep, a subtracted value (θe'−θi) obtained by subtracting the current electrical angle θi detected in the step S3 from the correction value θe' calculated at the step S5 is determined as a parameter (θe−θi), and the current phase β defined with these parameters is selected (a step S6).

Additionally, the rotor position θm is calculated. Specifically, a value of the current phase β selected at the step S6 and a value of the current electrical angle θi detected in the step S3 are assigned to a rotor computational expression (θm=θi−β) including the current phase β as a first variable and also including the current electrical angle θi as a second variable, thereby calculating the rotor position θm (a step S7).

Figure 10:
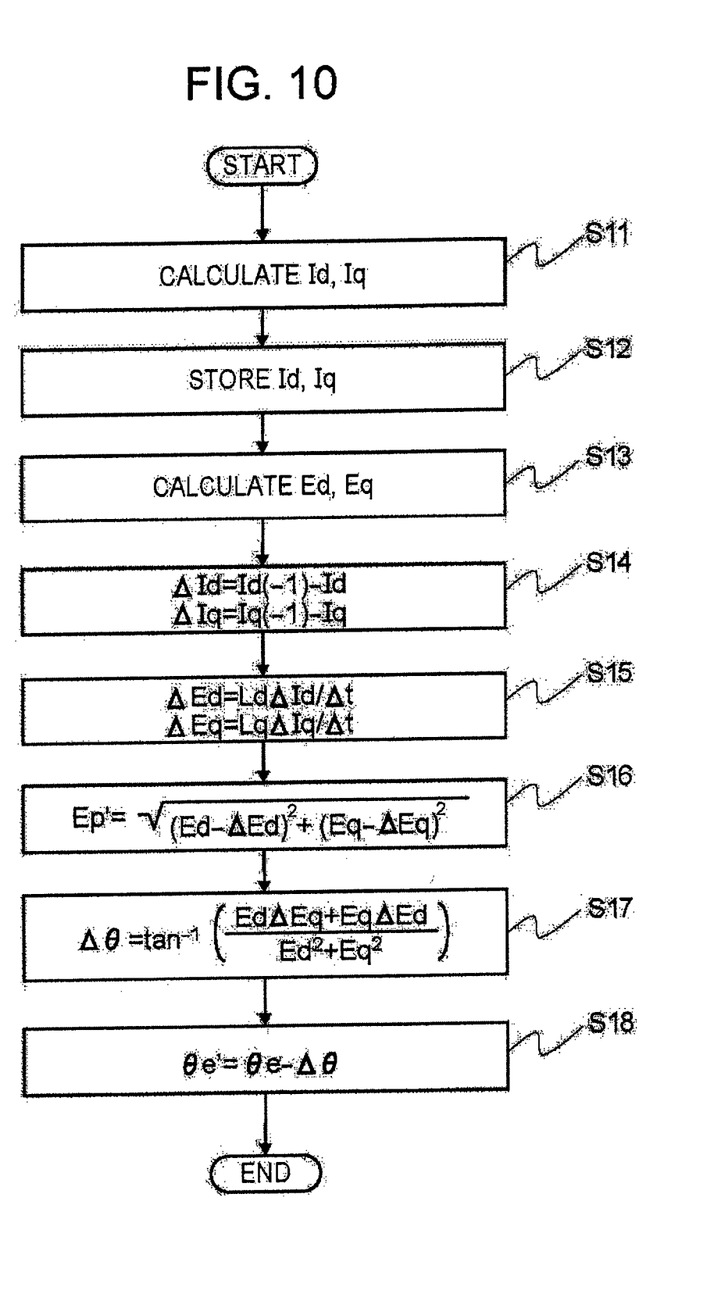
FIG. 10 is a flowchart for explaining processing contents of a step S5 in FIG. 7.

Hereunder the calculation of the correction value Ep' and the correction value θe' in the step S5 will be described in detail with reference to a flowchart of FIG. 10.

First, in the process of calculating the previous rotor position θm, the current phase β already selected by the phase selection unit 36 and the current peak value Ip detected in the step S3 are assigned to the relational expressions represented as Id=Ip×sin β and Iq=Ip×cos β from the motor vector diagram, whereby the d axis component Id and the q axis component Iq of the current I are calculated (a step S11).

Then, Id and Iq calculated in the step S11 are stored in the Id and Iq storage unit 42 (a step S12).

Furthermore, the current electrical angle θi calculated in the step S3, the induced voltage peak value Ep calculated in the step S4, the current phase β already selected by the phase selection unit 36 in the process of calculating the previous rotor position θm, and the correction value θe' already calculated by the correction value θe' calculation unit 50 are assigned to the relational expressions Ed=Ep×sin γ, Eq=Ep× cos γ, and γ=β+θe−θi from the motor vector diagram, whereby the d axis component Ed and the q axis component Eq of the induced voltage E are calculated (a step S13).

Subsequently, the d axis component ΔId and the q axis component ΔIq in a variation of the current I are calculated. Specifically, Id and Iq calculated in the step S11 are subtracted from Id(−1) and Iq(−1) stored in the process of calculating the previous rotor position θm in Id and Iq stored by the Id and Iq storage unit 42, respectively, thereby obtaining a subtracted value ΔId(=Id(−1)−Id) and a subtracted value ΔIq (=Iq(−1)−Iq) (a step S14).

Then, in a step S15, the d axis component ΔEd and the q axis component ΔEq in a variation of the induced voltage E are calculated. First, a current change rate of the d axis component (ΔId/Δt) and a current change rate of the q axis component (ΔIq/Δt) at a predetermined time Δt are calculated from the d axis component ΔId and the q axis component ΔIq in a variation of the current I obtained in the step S14, respectively. As the predetermined time Δt, a time interval of detection executed by the current detection unit 22 and the voltage detection unit 24, that is, an execution interval of this control processing, is used.

Furthermore, the current change rate of the d axis component (ΔId/Δt) is multiplied by a component Ld (a constant) having the inductance of each of the coils Uc, Vc, and Wc reflected to the d axis, thereby calculating ΔEd(=Ld×ΔId/Δt). Similarly, the current change rate of the q axis component (ΔIq/Δt) is multiplied by a component Lq (a constant) having the inductance of each of the coils Uc, Vc, and Wc reflected to the q axis, thereby calculating ΔEq(=Lq×ΔIq/Δt).

Furthermore, based on the d axis component ΔEd and the q axis component ΔEq in the variation of the induced voltage E calculated in the step S15, the correction value Ep' of the induced voltage peak value Ep detected in the step S4 is calculated. Specifically, the relational expression of the induced voltage peak value Ep and the d axis component Ed and the q axis component Eq of the induced voltage E is corrected in view of the d axis component ΔEd and the q axis component ΔEq in the variation of the induced voltage E to obtain the following relational expression:

$$Ep' = \sqrt{(Ed - \Delta Ed)^2 + (Eq - \Delta Eq)^2}$$ [Expression 5]

Respective values of the d axis component Ed and the q axis component Eq of the induced voltage E calculated in the step S13 and ΔEd and ΔEq calculated in the step S15 are assigned to this relational expression, thereby obtaining the correction value Ep' (a step S16).

Subsequently, based on the d axis component ΔEd and the q axis component ΔEq in the variation of the induced voltage E calculated in the step S15, the variation Δθ of the induced voltage electrical angle θe detected in the step S4 is calculated (a step S17). This step S17 will be explained in detail below. The induced voltage electrical angle θe affected by a change in induced voltage E is represented as θe=tan⁻¹(Eq/Ed), and an induced voltage electrical angle θe' from which the influence of the change in induced voltage E has been removed is represented as θe'=tan⁻¹{(Eq−ΔEq)/(Ed−ΔEd)}. Therefore, since the variation Δθ is represented as Δθ=θe−θe', it is approximately represented by the following expression:

$$\Delta\theta = \tan^{-1}\left(\frac{Ed\Delta Eq + Eq\Delta Ed}{Ed^2 + Eq^2}\right)$$ [Expression 6]

Respective values of the d axis component Ed and the q axis component Eq of the induced voltage E calculated in the step S13 and the d axis component ΔEd and the q axis component ΔEq in the variation of the induced voltage E calculated in the step S15 are assigned to this expression, thus calculating the variation Δθ.

Moreover, in a step S18, a subtracted value (θe−Δθ) obtained by subtracting the variation Δθ calculated in the step S17 from the induced voltage electrical angle θe detected in the step S4 is calculated as the correction value θe'.

According to such a motor control device 10, the correction unit 32 removes deviations of a value of pLd·Id and a value of pLq·Iq for the induced voltage peak value Ep and the induced voltage electrical angle θe detected by the induced voltage polar coordinate conversion unit 28 in the steady state from those in the non-steady state to thereby correct the induced voltage peak value Ep and the induced voltage electrical angle θe into the correction value Ep' and the correction value θe', respectively. Therefore, the current phase β or the induced voltage phase γ can be selected based on the parameters including the correction value Ep' and the correction value θe' corrected according to a rapid fluctuation in load, and hence a detection accuracy of a rotor position at the time of transition can be enhanced.

It is to be noted that, in the motor control device 10, the phase selection unit 36 may select the current phase β or the induced voltage γ by using well-known interpolation technology that interpolates the current phase β or the induced voltage γ between respective parameter values in the data table. In FIG. 3, for example, when the induced voltage peak value Ep is 45 V and the subtracted value (θe−θi) obtained by subtracting θe detected by the induced voltage polar coordinate conversion unit 28 from θi detected by the current polar coordinate conversion unit 26 is detected as 25.5°, the phase selection unit 36 may select the current phase β as −1.5° based on linear interpolation.

Furthermore, in the motor control device 10, the voltage detection unit 24 detects voltages applied to the coils by using the three branch lines from the connection line of the synchronous motor 12 and the inverter 16, but it may detect voltages applied to the coils from a voltage of the direct-current power supply 14 and an ON and OFF ratio of a signal that drives the switching element of the inverter 16 (for example, a duty ratio of a PWM signal). As a result, since the drive signal for the switching element can be detected in the motor control device 10, the branch lines used for detecting the voltage of the direct-current power supply 14 can be omitted.

It should be noted that the entire contents of Japanese Patent Application No. 2011-095691, filed in Apr. 22, 2011, on which convention priority is claimed, is incorporated herein by reference.

While only a select embodiment has been chosen to illustrate and describe the present invention, it will be apparent to those skilled in the art from this disclosure that various changes and modifications can be made without departing from the scope of the invention as defined in the appended claims.

Furthermore, the foregoing description of the embodiment according to the present invention is provided for illustration only, and it is not for the purpose of limiting the invention (the invention as claimed in the appended claims and their equivalents).

REFERENCE SIGNS LIST

10 . . . motor control device
12 . . . synchronous motor
22 . . . current detection unit
24 . . . voltage detection unit 26 ... current polar coordinate conversion unit
28 ... induced voltage polar coordinate conversion unit
32 ... correction unit
34 ... phase storage unit
36 ... phase selection unit
38 ... rotor position calculation unit
40 ... dq value calculation unit
42 ... Id and Iq storage unit
44 ... ΔId and ΔIq calculation unit
46 ... ΔEd and ΔEq calculation unit

The invention claimed is:

1. A motor control device having a function of detecting a rotating rotor position of a synchronous motor in a sensor-less manner, comprising:
   current detecting means for detecting a current flowing through a coil of the synchronous motor;
   voltage detecting means for detecting a voltage applied to the coil of the synchronous motor;
   Ip and θi detecting means for detecting a current peak value Ip and a current electrical angle θi based on the current detected by the current detecting means;
   Ep and θe detecting means for detecting an induced voltage peak value Ep and an induced voltage electrical angle θe based on the current detected by the current detecting means and the voltage detected by the voltage detecting means;
   phase storing means for previously storing a current phase β or an induced voltage phase γ defined by at least two parameters selected from a value of Ip, a value of Ep, and a subtracted value (θe-θi) obtained by subtracting θi from θe;
   phase selecting means for selecting β or γ based on Ip and θi detected by the Ip and θi detecting means and Ep and θe detected by the Ep and θe detecting means by making reference to β or γ stored in the phase storing means;
   rotor position calculating means for calculating a rotor position θm from a rotor position computational expression using β selected by the phase selecting means as a first variable and using θi detected by the Ip and θi detecting means as a second variable or a rotor computational expression using γ selected by the phase selecting means as a first variable and using θe detected by the Ep and θe detecting means as a second variable; and
   correcting means for correcting at least one of Ep and θe, which are detected by the Ep and θe detecting means and included in the at least two parameters that define β or γ, according to a change in current flowing through the coil at the time of selecting β or γ by the phase selecting means.

2. The motor control device according to claim 1, wherein the correcting means corrects Ep or θe detected by the Ep and θe detecting means based on a coil current change rate at which a d axis component and a q axis component in a rotating coordinate system of the current flowing through the coil change within a predetermined time.

3. The motor control device according to claim 2, wherein the correcting means corrects θe detected by the Ep and θe detecting means based on a variation Δθ of θe obtained by using the coil current change rate.

4. The motor control device according to claim 3, wherein the coil current change rate is obtained by subtracting the d axis component and the q axis component of the current detected by the current detecting means at present from the d axis component and the q axis component of the current detected immediately before the present detection, respectively, and dividing each subtraction result by a time interval between the present detection and the previous detection.

5. The motor control device according to claim 2, wherein the coil current change rate is obtained by subtracting the d axis component and the q axis component of the current detected by the current detecting means at present from the d axis component and the q axis component of the current detected immediately before the present detection, respectively, and dividing each subtraction result by a time interval between the present detection and the previous detection.

* * * * *